United States Patent [19]

Sramek

[11] 3,929,743

[45] Dec. 30, 1975

[54] POLYAMPHOLYTES

[75] Inventor: John A. Sramek, Racine, Wis.

[73] Assignee: S. C. Johnson & Son, Inc., Racine, Wis.

[22] Filed: Feb. 11, 1974

[21] Appl. No.: 441,591

Related U.S. Application Data

[63] Continuation-in-part of Ser. No. 296,438, Oct. 10, 1972, abandoned, which is a continuation-in-part of Ser. No. 178,502, Sept. 7, 1971, abandoned, which is a continuation-in-part of Ser. No. 794,356, Jan. 27, 1969, abandoned.

[52] U.S. Cl.... 260/80.8; 260/29.6 TA; 260/63 UY; 260/78.5 T; 260/80.73; 260/80.75
[51] Int. Cl.$^2$............................................. C08F 8/30
[58] Field of Search....... 260/63 UY, 78.5 T, 80.75, 260/80.8, 85.5 S, 86.1 R, 88.1 PC:80.73

[56] References Cited
UNITED STATES PATENTS

| | | | |
|---|---|---|---|
| 3,057,812 | 10/1962 | Straughan et al.................. | 260/29.6 |
| 3,282,879 | 11/1966 | Werner............................. | 260/29.6 |
| 3,386,939 | 6/1968 | Mesec.............................. | 260/29.3 |

*Primary Examiner*—Stanford M. Levin

[57] ABSTRACT

Water-soluble polyampholyte polymers are prepared by reacting (1) a low molecular weight copolymer having pendant carboxylic acid groups and (2) an aziridine compound in an amount sufficient to iminate only a portion of said acid groups, and then neutralizing at least a portion of the remaining acid groups with a base to render the polymer water-soluble. The compositions of this invention are low molecular weight synthetic addition polyampholyte polymers containing a plurality of pendant free carboxylic acid groups and a plurality of pendant carboxylic aminoester groups of the formula —COO CHR$^2$CHR$^3$NHR$^1$, each of R$^1$, R$^2$ and R$^3$ being lower alkyl or hydrogen, said polymer being capable of dissolving in water upon reaction with base.

10 Claims, No Drawings

POLYAMPHOLYTES

This application is a continuation-in-part of Sramek U.S. Ser. No. 296,438, filed Oct. 10, 1972, now abandoned, which in turn is a continuation-in-part of Sramek U.S. Ser. No. 178,502, filed Sept. 7, 1971, now abandoned, which in turn is a continuation-in-part of Sramek U.S. Ser. No. 794,356, filed Jan. 27, 1969, now abandoned.

This invention relates to novel polymer compositions and to the processes for making and using such compositions.

It is known in the art that polymers containing carboxylic acid groups can be reacted with aziridinyl compounds to introduce pendant amine groups into the polymer. This technique has been employed to produce water-soluble polymers in which all of the available carboxylic acid groups have been reacted with the aziridinyl compound, or to produce water-insoluble, emulsified polymers in which a portion of the available carboxylic acid groups has been reacted with the aziridinyl compound. However, the art does not teach the preparation of water-soluble, amphoteric polymers wherein only a portion of the available carboxylic acid groups has been reacted with an aziridinyl compound.

This invention provides polyampholyte polymers (herein also referred to as "polyampholytes") which are rendered water-soluble upon reaction with a base and which possess unique and outstanding properties. In particular, these polyampholytes are highly useful as components of aqueous-based coating compositions, as exemplified by floor polishes or the like. The films deposited from such compositions have outstanding physical properties, and it is believed that this is due to the fact that (i) the polyampholytes are applied in the form of a solution rather than an emulsion, and (ii) the intermolecular forces resulting from the presence of both anionic and cationic groups in the polyampholyte. The novel polyampholytes of this invention are also useful in other areas in which film-forming properties are important, for example, as components of hair sprays, setting lotions, and the like.

The novel polyampholytes of the present invention are low molecular weight (generally from about 10,000 to about 200,000) polymers prepared by imination of a low molecular weight copolymer comprising a carboxylic acid-containing monomer and a "soft" monomer, "hard" monomer, or "hydrophilic" monomer. The copolymer can be prepared using a mixture of one or more acid-containing monomers and any combination of one or more soft, hard, or hydrophilic monomers. For example, the copolymer can be prepared using one acid-containing monomer, two soft monomers, and one hard monomer.

Soft monomers are those monomers which produce flexible homopolymers having a brittle point below about 20°C. The most useful soft monomers are vinyl acetate; the alkyl esters of acrylic acid wherein said alkyl group contains from 1–12 carbon atoms, exemplified by methyl acrylate, ethyl acrylate, butyl acrylate, hexyl acrylate, 2-ethyl-hexyl acrylate, etc.; and the higher alkyl esters of methacrylic acid wherein said higher alkyl group contains from 4–12 carbon atoms, exemplified by butyl methacrylate, 2-ethylhexyl methacrylate and lauryl methacrylate. The preferred soft monomers are ethyl acrylate and butyl acrylate.

Suitable hard monomers which can be included in the copolymer are the lower alkyl methacrylates wherein said lower alkyl group contains 1–3 carbon atoms, such as methyl methacrylate, ethyl methacrylate and isopropyl methacrylate; cycloalkyl acrylates and methacrylates wherein said cycloalkyl group contains 5–7 carbon atoms, such as cyclohexyl acrylate and cyclohexyl methacrylate; and hard vinyl monomers such as styrene and acrylonitrile. The preferred hard monomers are the lower alkyl methacrylates, particularly methyl methacrylate.

The carboxylic acid-containing monomers are monoethylenically unsaturated compounds having at least one, and preferably only one, carboxylic acid group. Examples of useful compounds include acrylic acid, methacrylic acid, itaconic acid, maleic acid, crotonic acid, monoalkyl esters of itaconic and maleic acids wherein said alkyl group contains 1–8 carbon atoms, etc. The preferred acid-containing monomer is methacrylic acid.

Examples of useful hydrophilic monomers include 2-hydroxyethyl acrylate, 2-hydroxyethyl methacrylate, ethoxyethyl acrylate, ethoxyethyl methacrylate, and diacetone acrylamide.

In one of its embodiments, this invention provides a polyampholyte having a molecular weight from about 10,000 to about 200,000 and containing a plurality of pendant carboxylic acid groups and a plurality of pendant carboxylic aminoester groups of the formula

—COOCHR²CHR³NHR¹ each of R¹, R² and R³ being hydrogen or a lower alkyl group containing 1–7 carbon atoms, said carboxylic acid groups and said carboxylic aminoester groups being derived from a monoethylenically unsaturated carboxylic acid monomer, wherein said polyampholyte is derived from a copolymer which comprises 16% to about 40% by weight of said acid monomer and about 60 to 84% by weight of a complementary monomer selected from the group consisting of alkyl esters of acrylic acid wherein said alkyl group contains 1–12 carbon atoms, higher alkyl esters of methacrylic acid wherein said higher alkyl group contains 4–12 carbon atoms, vinyl acetate, styrene, acrylonitrile, cycloalkyl acrylates and cycloalkyl methacrylates wherein said cycloalkyl group contains 5–7 carbon atoms, lower alkyl esters of methacrylic acid wherein said lower alkyl group contains 1–3 carbon atoms, 2-hydroxyethyl acrylate, 2-hydroxyethyl methacrylate, ethoxyethyl acrylate, ethoxyethyl methacrylate, diacetone acrylamide, and a mixture of two or more of said monomers; wherein said polyampholyte is water-soluble upon reaction with base.

Preferably, the copolymers employed in the practice of this invention will contain 16 to about 40% by weight acid-containing monomer, with the balance of the copolymer comprising complementary amounts of hard and soft monomers, in the amount of about 10 to 84% soft monomer and about 10% to 84% hard monomer.

The especially preferred copolymers are those containing 16 to about 40% acid monomer, about 25 to 60% soft monomer, and about 10 to 60% hard monomer. It will be understood that the precise composition selected will depend upon the desired ultimate physical characteristics and the identity of the particular monomers employed.

When a hydrophilic monomer is used in preparing the copolymer, a preferred amount of such monomer is about 5 to about 40% by weight.

The acid-containing copolymers subjected to imination in accordance with this invention are conveniently prepared by emulsion polymerization techniques. The desired monomers, in the proper ratio, are blended together and added to an aqueous system containing an emulsifying agent and a suitable free radical initiator. Typical useful emulsifying agents include anionic surfactants such as sodium tridecyl ether sulfate, dioctyl sodium sulfosuccinate, and sodium salts of alkylaryl polyether sulfonates; and nonionic surfactants such as alkylaryl polyether alcohols and ethylene oxide condensates of propylene oxide-propylene glycol adducts. Suitable initiators include any of the known water-soluble free radical initiators including alkali metal persulfates, ammonium persulfate, hydrogen peroxide, and combinations thereof with suitable reducing agents such as sodium bisulfite.

The copolymers employed will preferably have a low molecular weight, of the order of about 9,000 up to about 180,000. Low molecular weights are desirable in order to obtain the greatest degree of water solubility in the ultimate polyampholyte. In some cases, the monomers employed may inherently give a low molecular weight copolymer. However, it will usually be desirable to employ a chain-transfer agent or chain regulator in the polymerization to produce a copolymer having optimum molecular weight characteristics. Typical chain-transfer agents which can be used are long-chain mercaptans such as lauryl mercaptan, mercaptoacids such as β-mercapto-propionic acid and thioglycollic acid, allylic compounds, and halogenated hydrocarbons such as carbon tetrachloride, chloroform and bromotrichloromethane.

The maximum and minimum molecular weights which give useful copolymers will necessarily vary, depending upon the precise monomers chosen and the ratio of the monomers in the copolymer. Molecular weights which are too high will lead to excessively turbid, viscous or gelled solutions or to complete loss of water solubility. Undesirably low molecular weights will result in deterioration of physical strength as well as a reduction in the chemical and mechanical resistance of the ultimate film. In general, the factors which permit the use of higher molecular weights are: a high proportion of acid-containing monomer; use of lower alkyl methacrylates, e.g., methyl methacrylate, as the hard monomer; and use of lower alkyl acrylates such as the soft monomer.

These emulsion copolymers are converted to the polyampholytes of the present invention by imination, i.e., by reaction with an aziridinyl compound. Exemplary aziridinyl compounds which may be used are those corresponding to the general formula

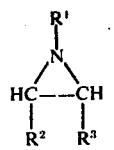

wherein $R^1$, $R^2$ and $R^3$ are each hydrogen or lower alkyl. When any of these groups is lower alkyl, it will preferably be an alkyl containing 1–7 carbon atoms and most preferably containing 1–4 carbon atoms, say methyl and ethyl. The lower alkyl groups may also bear one or more inert substituents, i.e., substituents which do not interfere with the desired reaction. Such inert substituents include, for example, hydroxy, amino, lower alkoxy, aryl, and heterocyclic groups. It is generally preferred that at least one of $R^2$ and $R^3$ be hydrogen. Examples of suitable aziridinyl compounds include ethylenimine; propylenimine; 1,2-butylenimine; 2,3-butylenimine; N-(2-hydroxyethyl) aziridine; N-ethylaziridine; N-(2-aminoethyl) aziridine; N-methylaziridine; N-(3-hydroxypropyl) aziridine; N-(2-ethoxyethyl) aziridine; and N-(2-morpholinylethyl)aziridine.

The copolymer is conveniently reacted with the aziridinyl compound by adding the latter directly to the copolymer emulsion. The concentrations of the two reactants are not critical, but control of the principal reaction and avoidance of undesired side reactions is minimized by employing aqueous solutions of about 10 to about 40% (e.g., 25%) by weight of the aziridinyl compound and copolymer emulsions containing about 10 to about 35% (e.g., 25%) by weight solids. The reaction is preferably carried out at temperature ranging from about 20° to 80°C. for a period of time sufficient to achieve the highest practical efficiency of reaction. In general, the imination reaction is conducted at an acidic pH, although the acid-containing copolymer may, if desired, be partially neutralized prior to the addition of the aziridinyl compound.

As previously noted, the copolymers are only partially iminated so that the final polyampholyte contains both iminated and free carboxylic acid groups. In practice, it will be found that, due to a minor amount of side reaction, the imination reaction is not 100% efficient, i.e., the number of aziridine groups consumed is somewhat greater than the number of carboxylic acid groups reacted. In addition to the desired reaction I (and using ethylenimine as the illustrative reactant)

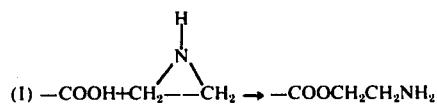

one or more of the following side-reactions may occur

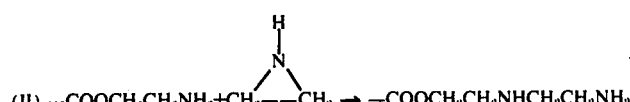

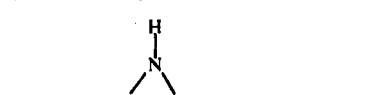

As will be apparant, side-reactions II and III can lead to polymeric products. Under the reaction conditions employed in practice of this invention, side reactions III and IV are minimized and reaction efficiencies of the order of 60% to as high as about 90% can be realized.

The imination reaction will preferably be carried out to a sufficient extent to convert from about 5 to about 80% of the available free carboxylic acid groups to aminoester groups, in accordance with reaction I, above. Thus, the ratio of acid to aminoester groups will be in the range of about 19:1 to 0.25:1. In preferred embodiments, about 25 to about 70% of the available free carboxylic acid groups will be so reacted.

Depending upon the precise efficiency of reaction for the particular system, polyampholytes having the desired composition are obtained by adding the aziridinyl compound in the amount of about 0.05 to about 1.3 equivalents, and preferably about 0.1 to about 0.8 equivalents per equivalent of available free carboxylic acid in the copolymer. Regulation of reaction conditions and azuridine to acid ratios to obtain the precise composition desired can be easily accomplished by running a series of pilot reactions and analyzing the polyampholytes obtained. Residual free carboxylic acid content of the polyampholytes can be estimated by freeze-drying the polyampholyte, dissolving the residue in acetonebenzene and titrating with alcoholic sodium hydroxide. The amine content is estimated by a similar method, substituting alcoholic hydrochloric acid as the titration reagent.

Following the imination reaction, the polyampholyte is rendered water-soluble by addition of a suitable base. It will be understood that the term "water-soluble" as used herein is not restricted to its most technical definition. In preferred embodiments of the invention, it is possible to obtain clear products having the appearance of true solutions. Other embodiments may yield hazy, turbid, opalescent or even somewhat opaque products. However, in all cases, the polyampholytes will be found to be in a highly solvated or swollen state, as distinguished from the original emulsions containing discrete particles of polyampholyte. Any base, including sodium hydroxide, potassium hydroxide, sodium carbonate, etc., will convert the polyampholyte to a water-soluble alkali metal salt form. However, where it is desired to employ the polyampholytes to produce clear, water and detergent resistant films, it is most desirable to use ammonia or a volatile amine such as methylamine, ethylamine or morpholine as the neutralizing agent. The percentage of the residual free carboxylic acid groups which must be neutralized in order to obtain the desired degree of water solubility will depend upon the composition of the polyampholyte employed, particularly on its total acid content, and on the degree to which the available carboxylic acid groups have been iminated. Generally, it is advisable to add sufficient base to neutralize all of the residual carboxylic acid groups.

During the addition of the base, the emulsified polyampholyte particles will begin to swell and a marked increase in viscosity will be observed. Moderate agitation is desirable to facilitate dissolution of the polyampholyte and to prevent the formation of coagulated, gelatinous lumps. The viscosity usually passes through a maximum and then decreases somewhat as neutrality is passed. In general, the pH of the solution will be adjusted to about 8 to 10 to obtain the desired stability and viscosity characteristics.

The resulting solutions are especially useful in the preparation of coating compositions, particularly floor care products. Films prepared from the solutions possess unique properties. When compared to the original copolymers from which they are made, the polyampholytes of this invention have superior physical strength and resistance to water and detergents. Their aqueous solutions are also lower in viscosity than are comparable solutions of the original copolymers. Because of the ampholytic properties of the polymer, the film can be redispersed and removed from a surface by treatment with either acidic or ammoniacal reagents.

The physical properties and resistance of the films can be further improved by incorporating into the formulation a suitable cross-linking agent such as a compound which can form complexes or salts with either the residual acid groups, the amine groups, and preferably both. Polyvalent metal ions such as zinc, zirconium, iron, nickel, cobalt, calcium and magnesium ions are capable of forming cross-links with both carboxyl and amine groups and have the further advantage that the cross-links can subsequently be broken by treatment with either ammonia or acid. The preferred metal cross-linking agents are complexes of polyvalent metal ions such as zinc, cadmium, copper or nickel with volatile complexing agents such as ammonia or a volatile amine, and complexes of zirconium with anions such as carbonate or acetate. When metal cross-linking agents are employed, they will preferably be used in amounts of about 0.05 to about 0.5 equivalents per equivalent of carboxylic acid present in the copolymer before imination. The nature and use of illustrative complex cross-linking agents are particularly described in U.S. Pat. No. 3,308,078 to Rogers et al. and U.S. Pat. No. 3,320,169 to Rogers, the disclosures of which are incorporated herein by reference.

The polyampholytes can be blended with other components normally used in floor-coating compositions, including solvents, detergents, waxes, shellacs, silicones and the like. They are also useful in other types of coating compositions such as paints, varnishes, metal finishes, etc.

This invention will be further illustrated by the following examples of preferred embodiments. However, it will be understood that these examples are included for purposes of illustration and are not intended to limit the scope of this invention.

EXAMPLES 1–22

A series of copolymers is prepared from the monomers identified in Table I in the noted proportions. In each case, the monomers are mixed with about 2.0% by weight bromotrichloromethane and the mixture is added, in a quantity sufficient to give a final solids content of about 35%, to water containing 2% by weight sodium lauryl sulfate, 1% by weight sodium alkyl aryl sulfonate sold under the trademark Triton X-200, and 1% by weight ammonium persulfate. The polymerization is carried out by flushing the polymerization vessel with nitrogen, heating the aqueous system to about 83°C., adding the monomer mixture dropwise over a period of 1 hour and heating for an additional 0.5 hour to a final temperature of about 92°C. In each case, the product obtained is a copolymer emulsion having a total solids of about 34 to 35%, a pH of about 2 and a conversion of 98 to 100%.

In Table I, the proportions of the monomers employed are given in percent by weight and the following abbreviations are used:
MAA = methacrylic acid
MMA = methyl methacrylate
S = styrene
EA = ethyl acrylate
BA = butyl acrylate
EHA = 2-ethylhexyl acrylate The viscosity figures are the values obtained, expressed in centipoise units, from a solution prepared by neutralizing the copolymer with ammonium hydroxide and adjusting the pH to 9.5 and the concentration to 15 or 19% by weight solids.

TABLE I

| Example No. | Composition | Viscosity |
|---|---|---|
| 1 | 40 MMA/40 BA/20 MAA | 95 |
| 2 | 35 MMA/40 BA/25 MAA | 270 |
| 3 | 40 S/40 BA/20 MAA | 66.5 |
| 4 | 35 S/40 BA/25 MAA | 261.5* |
| 5 | 30 S/40 BA/30 MAA | 725* |
| 6 | 25 S/40 BA/35 MAA | 1215* |
| 7 | 50 MMA/40 EA/10 MAA | 17.5 |
| 8 | 45 MMA/40 EA/15 MAA | 134 |
| 9 | 40 MMA/40 EA/20 MAA | 457.5 |
| 10 | 35 MMA/40 EA/25 MAA | 242 |
| 11 | 40 S/40 EA/20 MAA | 66* |
| 12 | 35 S/40 EA/25 MAA | 955* |
| 13 | 30 S/40 EA/30 MAA | 431* |
| 14 | 25 S/40 EA/35 MAA | 230* |
| 15 | 45 MMA/40 EHA/15 MAA | 18.5 |
| 16 | 40 MMA/40 EHA/20 MAA | 64.5 |
| 17 | 35 MMA/40 EHA/25 MAA | 493 |
| 18 | 30 MMA/40 EHA/30 MAA | 37.5* |
| 19 | 40 S/40 EHA/20 MAA | 17.5 |
| 20 | 35 S/40 EHA/25 MAA | 96.5 |
| 21 | 30 S/40 EHA/30 MAA | 45.5* |
| 22 | 25 S/40 EHA/35 MAA | 547* |

*at 15% solids, all others at 19% solids

Each of the above copolymers is adjusted to 25% solids and heated to 50°C. A 25% solution of ethylenimine in water is added in a quantity sufficient to give 0.4 equivalents of ethylenimine per equivalent of free carboxylic acid in the copolymer. The mixture is heated at 50°C. for one hour, allowed to cool for 30 minutes, and ammonium hydroxide is added to dissolve the polyampholyte and adjust the pH to 9.5. The solids are adjusted to 15 or 19%, depending upon the viscosity, and the clarity and viscosity of the final solution are observed. The results are shown in Table II.

TABLE II

| Example No. | Viscosity | Appearance |
|---|---|---|
| 1 | 7.5 | v. sl. haze |
| 2 | 188.5 | " |
| 3 | 7.5 | opaque |
| 4 | 17.3 | v. hazy |
| 5 | 35* | v. sl. haze |
| 6 | 139.5* | " |
| 7 | 15.0 | clear |
| 8 | 43.5 | " |
| 9 | 388 | " |
| 10 | 702 | " |
| 11 | 5.9 | opaque |
| 12 | 20* | hazy |
| 13 | 147.5 | v. sl. haze |
| 14 | 284 | sl. haze |
| 15 | 13 | hazy |
| 16 | 28 | v. hazy |
| 17 | 154 | " |
| 18 | 17.5* | opaque |
| 19 | 6 | " |
| 20 | 8.5 | " |
| 21 | 25.5 | " |
| 22 | 33.8 | hazy |

*at 15% solids, all others at 19% solids

As will be apparent from Table II, the viscosity of the solutions of the polyampholytes is lower than the solutions prepared from the unmodified copolymers. The clarity of the polyampholyte solutions varies, with the preferred compositions giving clear solutions.

Each of the unmodified copolymers of Table I and each of the polyampholytes of Table II is incorporated into a floor polish formulation having the following composition:

| Component | Percent by Weight |
|---|---|
| polymer | 13.9 |
| surfactant (a) | 0.560 |
| Carbitol | 2.78 |
| tris (butoxyethyl) phosphate | 0.556 |
| zinc acetate (b) | variable |
| ammonium hydroxide | to pH 9.5 |
| water | balance |

(a) composed of a mixture of 4 parts by weight octyl phenoxy polyethoxy ethanol and 0.03 parts of cationic fluorocarbon sold under the trademark FC-134
(b) 0.24 equivalents per equivalent of free carboxyl in unmodified copolymer Each of the formulations is applied to squares of vinyl tile and allowed to dry. The coatings obtained are then evaluated for resistance to removal by detergents. It is found that all of the polyampholyte formulations have detergent resistance which is superior to that of their unmodified copolymer counterparts, with the greatest improvement being found in Examples 1, 2, 7–10 and 15–18. Additionally, the polyampholyte formulations give satisfactory gloss and are readily removed from the tile by treatment with ammonia. When the metal cross-linking agent is omitted, it is again found that formulations containing the polyampholytes are superior in detergent resistance to the formulations containing the corresponding unmodified copolymers.

EXAMPLES 23–26

Examples 16, 17, 19 and 20 are repeated, with the exception that the imination reaction is carried out with 0.2 equivalents of ethylenimine per equivalent of carboxylic acid. The results obtained are generally similar to those of the corresponding preceding examples, but the observed detergent resistance is not quite so high as that obtained with the more iminated polyampholytes.

EXAMPLES 27–31

Example 1 is repeated, with the exception that each of the following aziridinyl compounds is substituted for ethylenimine, in the amount of 0.4 equivalents per equivalent of carboxylic acid:
Example 27 — N-(2-hydroxyethyl) aziridine
Example 28 — N-(2-morpholinylethyl) aziridine
Example 29 — N-ethylaziridine
Example 30 — N-(2-aminoethyl) aziridine
Example 31 — propylenimine The imination reaction is carried out at 25°C. and the polyampholytes are dissolved and formulated as in Example 1. In each case, the properties of the polyampholyte formulations are superior to their unmodified copolymer counterparts. The best results are obtained where propylenimine, N-(2-morpholinylethyl) aziridine and N-ethylaziridine are employed.

EXAMPLES 32–37

An emulsion copolymer having the weight composition 10% styrene, 30% methyl methacrylate, 40% butyl acrylate, and 20% methacrylic acid is prepared in the same manner as described in Examples 1–22. A portion of the copolymer, identified as Example 32, is reserved as a control and other portions, designated Examples 33–37, are iminated as follows under the conditions of Examples 1–22. The term "Ratio" refers to the number of equivalents of aziridinyl compound per equivalent of free carboxylic acid in the polymer.

| Example | Aziridinyl Compound | Ratio |
|---|---|---|
| 33 | ethylenimine | 0.0 |
| 34 | " | 0.2 |
| 35 | " | 0.4 |
| 36 | N-(2-hydroxyethyl) aziridine | 0.2 |
| 37 | " | 0.4 |

Each of the polymer compositions is incorporated into the standard floor polish formulation previously described. It is found that each of the polyampholyte formulations gives a film which, after 3 days' aging, has detergent resistance superior to that of the control, but is readily removable from the tile surface by treatment with ammonia.

As noted above, the novel polyampholytes of this invention are also useful in areas outside the floor polish field. The following formulations are given as illustrative of other uses for the polyampholytes.

EXAMPLE 38

An emulsion copolymer containing about 15.2% by weight methyl methacrylate, 62% butyl acrylate and 22.8% methacrylic acid is prepared in accordance with the general procedure given above and is iminated by reaction with ethylenimine in the amount of 0.4 equivalents per equivalent of free carboxyl. The resulting composition is adjusted to pH 9.5, zinc acetate is added thereto in the amount of 0.1 equivalents per equivalent of carboxyl in the unmodified copolymer, and water is added to adjust the total solids to 2% by weight. This solution is useful as a hair spray and can be applied to hair by use of a finger pump-type sprayer or packaged in a pressurized container according to conventional techniques. The formulation of this example provides body and control of hair which is highly durable and long-lasting.

EXAMPLE 39

Following the procedure described in Examples 1–22, a copolymer containing about 42.8% by weight methyl methacrylate, 40% by weight butyl methacrylate, and 17.2% by weight methacrylic acid is prepared and then iminated by reaction with ethylenimine in the amount of 0.4 equivalents per equivalent of free carboxyl. The pH of the resulting composition containing the polyampholyte is adjusted to 9.5, and water is added to adjust the total solids to 2% by weight.

Following the procedure of Examples 1–22, this composition is incorporated into a floor polish formulation (without a metal cross-linking agent) which is then tested. It is found that this formulation has good detergent resistance, satisfactory gloss, and is readily removed by treatment with ammonia.

EXAMPLE 40

The procedure of Example 39 is followed except that the copolymer comprises 44% by weight methyl methacrylate, 40% by weight ethyl acrylate, and 16% by weight methacrylic acid. The resulting composition containing the polyampholyte is incorporated into a floor polish formulation which is tested as described in Example 39. Similar results are obtained.

EXAMPLE 41

Following the procedure of Examples 1–22, a copolymer is prepared from 69% by weight butyl acrylate and 31% by weight methacrylic acid. This copolymer is iminated by the reaction of ethylenimine in the amount of 0.026 equivalents per equivalent of free carboxy. The pH of the resulting composition containing the polyampholyte is adjusted to 8.5, and water is added to adjust the total solids to 2% by weight. This solution is useful as a hair spray and can be applied to hair by the use of a finger pump-type sprayer or packaged in a pressurized container according to conventional techniques. The formulation of this example provides durable and long-lasting body and control of hair.

EXAMPLE 42

Using the procedure of Example 41, a copolymer is prepared from 69% butyl methacrylate and 31% by weight methacrylic acid. When the resulting composition containing the polyampholyte is incorporated into a hair spray formulatiion as described in Example 41, similar results are obtained.

Although this invention has been described in detail with particular reference to preferred embodiments thereof, it will be understood that variations and modifications can be effected within the spirit and scope of this invention as described hereinabove and as defined in the appended claims.

I claim:

1. A polyampholyte having a molecular weight of from about 10,000 to about 200,000 and containing pendent carboxylic acid groups and pendent carboxylic amino ester groups of the formula

—COO CHR$^2$CHR$^3$NHR$^1$ each of R$^1$, R$^2$ and R$^3$ being hydrogen or a lower alkyl group containing 1–7 carbon atoms wherein said polyampholyte is prepared by imination of a copolymer which comprises 16–40% by weight of a monoethylenically unsaturated carboxylic acid monomer and the balance being from 10–84% by weight of a hard monomer selected from the group consisting of styrene, acrylonitrile, cycloalkyl acrylates and cycloalkyl methacrylates wherein said cycloalkyl group contains 5–7 carbon atoms, lower alkyl esters of methacrylic acid wherein said lower alkyl group contains 1–3 carbon atoms and mixtures thereof and 10–84% by weight of a soft monomer selected from the group consisting of alkyl esters of acrylic acid wherein said alkyl group contains 1–12 carbon atoms, higher alkyl esters of methacrylic acid wherein said higher alkyl group contains 4–12 carbon atoms vinyl acetate and mixtures thereof; wherein said polyampholyte is water soluble upon reaction with base and the ratio of carboxylic acid groups to carboxylic amino ester groups is from about 19:1 to about 0.25:1.

2. A polyampholyte as defined by claim 1 wherein R$^2$ or R$^3$ is hydrogen.

3. A polyampholyte as defined by claim 1 wherein R$^1$, R$^2$ and R$^3$ are hydrogen.

4. A polyampholyte as defined by claim 1 wherein said carboxylic acid monomer is selected from the group consisting of acrylic, methacrylic, itaconic, maleic, and crotonic acids, and monoalkyl esters of itaconic and maleic acids wherein said alkyl group contains 1-8 carbon atoms.

5. A polyampholyte as defined by claim 1, wherein said carboxylic acid monomer is methacrylic acid.

6. A polyampholyte as defined by claim 1 wherein said soft monomer is ethyl acrylate or butyl acrylate.

7. A polyampholyte as defined by claim 1 wherein said hard monomer is methyl methacrylate.

8. The polyampholyte of claim 1 wherein said copolymer additionally contains from 5-40% by weight of a hydrophilic monomer selected from the group consisting of 2-hydroxy ethyl acrylate, 2-hydroxy ethyl methacrylate, ethoxyethyl acrylate, ethoxyethyl methacrylate and diacetone acrylamide and mixtures thereof.

9. The polyampholyte of claim 1 wherein said copolymer comprises 16-40% by weight acid monomer, 25-60% by weight soft monomer and 10-60% by weight hard monomer.

10. The polyampholyte of claim 1 wherein said carboxylic acid monomer is methacrylic acid, said soft monomer is butyl acrylate and said hard monomer is methylmethacrylate.

* * * * *